April 12, 1932.   H. ROSENTHAL   1,853,084
MANUFACTURE OF GAS
Filed March 1, 1928
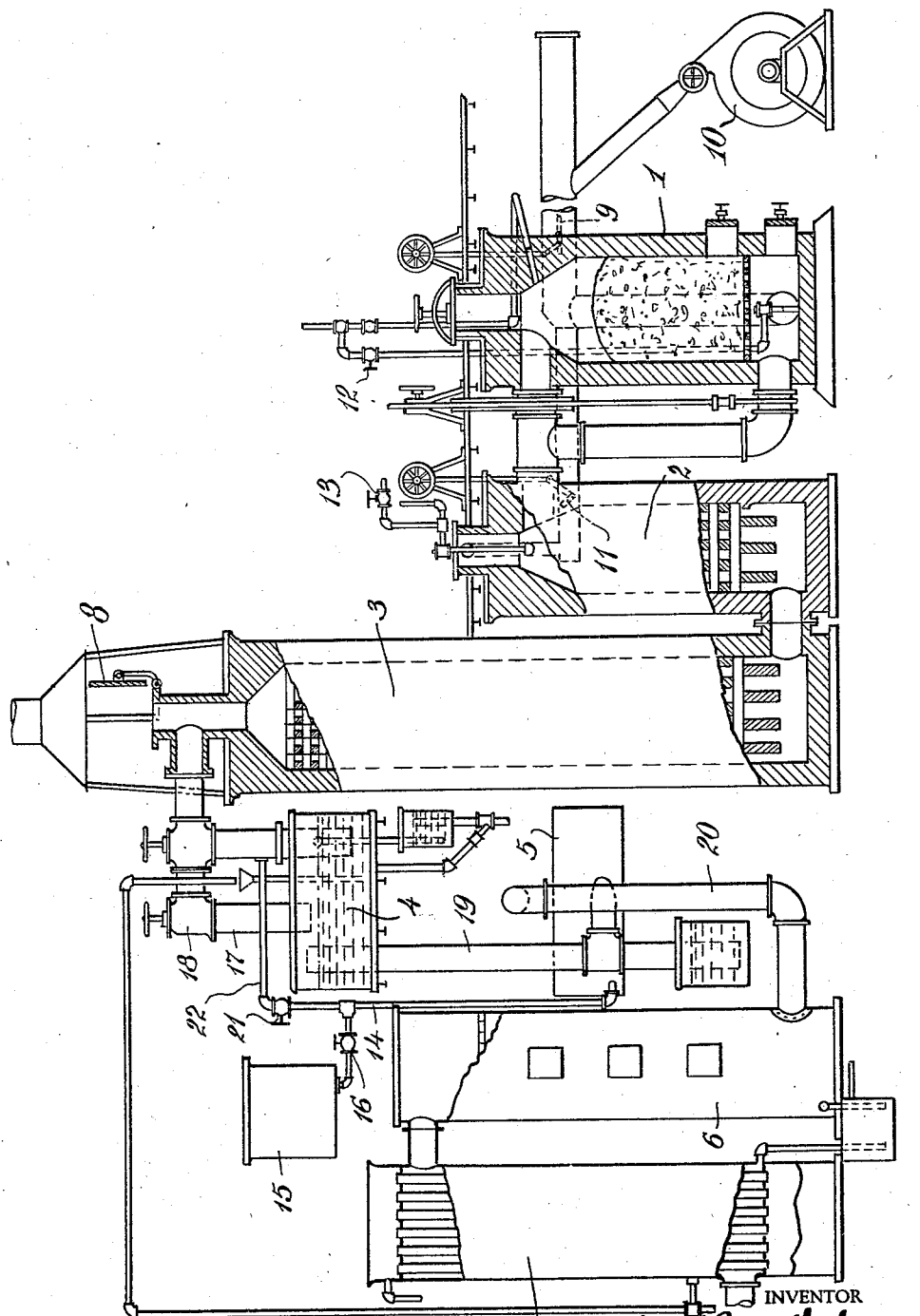
INVENTOR
Henry Rosenthal
BY Pennie, Davis, Marvin & Edmonds
ATTORNEYS Patented Apr. 12, 1932

1,853,084

UNITED STATES PATENT OFFICE

HENRY ROSENTHAL, OF NEW YORK, N. Y., ASSIGNOR TO COLUMBIA ENGINEERING & MANAGEMENT CORPORATION, OF NEW YORK, N. Y., A CORPORATION OF OHIO

MANUFACTURE OF GAS

Application filed March 1, 1928. Serial No. 258,161.

My invention is an improvement in the art of manufacturing artificial gas, and is especially applicable in connection with the manufacture of gas by the well known "water-gas" process, whether this process is used in making "blue water gas" or "carburetted water gas". However, I do not limit my invention for use in connection with the "water-gas" process, but it may be used equally well in conjunction with other gases.

The object of my invention is to provide a method adapted to supply a large amount of gas of any desired heating value, within reasonable limits, quickly and at relatively low cost.

Another object of the invention is the provision of a method whereby the heating value of gases, particularly such as are ordinarily of slight utility, may be supplemented so that the enriched gases may be utilized either with or without admixture with other heating gases.

As stated, my invention is especially applicable in connection with the manufacture of water-gas. It will be described, therefore, as it would be used in conjunction with the usual water-gas process.

Water gas is made by a cycle in which carbon in the form of coal or coke is heated by the combustion of part of the carbon blown by a blast of air. After the carbon is heated to the desired temperature, the air blast is stopped and the reaction of steam and hot carbon is utilized to form "water gas". The part of the cycle during which the combustion of the carbon takes place is known as the "blow". During the first part of the "blow" the composition of the gases leaving the generator consists mainly of carbon dioxide, $CO_2$, and nitrogen, $N_2$, and is practically devoid of heat units. As the "blow" continues, the percentage of carbon dioxide, $CO_2$, decreases, and some carbon monoxide, $CO$, is formed with a corresponding increase in heat units, but even at the end of the "blow" the heat content of the "blow gas" is so low that gas, even from this part of the cycle, is not generally utilized as part of the "gas make". That part of the cycle in which steam and hot carbon interact to form "blue water gas" is known as the "run" and it is from this part of the cycle that the gas made is utilized. When making "carburetted water gas" the "blue water gas" made during the "run" is enriched by the addition of oil gas made simultaneously with the "run" by auxiliary equipment known as a "carburetter" and "superheater". Since the gas produced during the "blow" has substantially no heating value, it is, in general, and except for minor variations of the cycle, wasted to the atmosphere and the gas made during the "run" is the only portion utilized.

The amount of gas wasted during the "blow" is of greater volume (under identical conditions) than the gas made and utilized during the "run". If some or all the "blow gas" could be so treated that it would have the required heating value, a large amount of additional gas could be made available. This gas would be especially desirable as a supplemental supply for "peak load" operation as it could be obtained with a comparatively small additional investment in plant, and with very little additional operating expense except for the cost of the enriching material. Under these conditions a comparatively high price could be paid for the enriching material.

According to the present invention, gases having slight or no heating value, produced, for example, during a part of a gas-making cycle, as in the water gas process are made available for commercial utilization by the addition thereto of volatile hydrocarbons, such as propane or butane or mixtures thereof, with or without other hydrocarbons of a similar character. Large quantities of propane, butane and similar hydrocarbons are available, and are commonly shipped as liquefied gas in tank cars or containers under pressure. These products are liquid at ordinary temperatures under pressure but they can be vaporized readily on reduction of pressure and when vaporized are mingled with a large volume of gas which is thereby enriched in heat units. The hydrocarbons mentioned remain as vapors in the gas under all of the conditions to which such gas is subjected normally during the course of distribution from the source to the place where it is utilized.

Such hydrocarbons can be effectively vaporized by utilizing the sensible heat of the hot gas to be enriched to provide the heat of vaporization necessary to convert the liquid hydrocarbons into the vapor phase. Thus, for example, the "blow" gas from the water gas cycle carries a considerable proportion of sensible heat which can be thus utilized to vaporize liquid hydrocarbons introduced thereto for the purpose of enriching the gas in heat units.

While I mention propane or butane or a mixture of these as enriching hydrocarbons, I do not limit myself to these liquids, as other hydrocarbons or mixtures of hydrocarbons can be used for the purpose, provided that the partial vapor pressure (of the liquid or of each of the components of the liquid, if the liquid is a mixture) when the required amount of enrichment has been added, is less than the vapor tension of each of the components in an equilibrium solution under the conditions of temperature and pressure to which the enriched gas will be subjected, which will be most favorable to the formation of an equilibrium solution.

Inasmuch as the gas to be enriched, such as "blow gas" from the water gas process, will be at an elevated temperature when the liquid is introduced, any liquid or mixture of liquids which will remain entirely vaporized under the most adverse conditions to vaporization, as described above, will be quickly vaporized, if efficiently sprayed into the gas undergoing enrichment and effectively mixed with it.

The invention will be described in further detail by reference to the accompanying drawing which is an elevation with parts in vertical section and represents a diagrammatic layout of a conventional apparatus for the manufacture of carburetted water gas to which apparatus for carrying out my invention is added.

Referring to the drawing, 1 is a water gas generator, 2 is a carbureter, 3 is a superheater, 4 is a water seal box, 5 is a gas-mixing chamber, 6 is a scrubber, and 7 is a condenser. Both the carbureter 2 and the superheater 3 are filled with checkerbrick.

The usual operating cycle of a carburetted water gas set is as follows: Consider the generator 1 charged to the proper depth with fuel. The stack valve 8 and the air valve 9 are opened, and air from the blower 10 is blown from below through the fuel bed and thence down through the carbureter 2, and up through the superheater 3. The air burns the fuel near the grates of the generator, and this zone becomes very hot. $CO_2$ is formed here by this reaction. Immediately above the zone of combustion the $CO_2$ is reduced to CO, and above this zone of reduction chemical action nearly ceases, and the hot gases from the reaction preheat the remainder of the fuel bed. At the beginning, the gases contain practically no CO, but as the fuel bed becomes hotter, the CO content increases. The secondary air valve 11 is then gradually opened, admitting sufficient air at the top of the carbureter 2 to burn the CO formed in the generator 1. The burning of the CO will heat the carbureter 2 and the superheater 3. When the proper temperatures have been reached in the generator, carbureter and superheater, the air valve 9 and the stack valve 8 are closed. This ends the "blow". The steam valve 12 and the oil valve 13 are then opened. As the steam passes up through the grates, it encounters the extremely hot fuel in the generator. Here it is highly heated, and almost instantly and completely reduced to a good "blue water gas", having a heat value of about 300 B. T. U. per cubic foot. At the same time, as the oil strikes the hot brickwork in the carbureter 2, it flashes into vapor, which, in its passage through the hot checkerbrick, cracks into a gas having a heating value of about 1700 B. T. U. per cubic foot.

The "blue water gas" and the gas from the oil are thoroughly mixed in their joint passage through the carbureter 2 and the superheater 3. The amount of oil admitted to the carbureter is regulated so that the amount of "oil gas" made will bear such relationship to the amount of "blue water gas" made, that the resulting mixed gas will have the desired heating value. During this part of the cycle, known as the "run", the gases leave the top of the superheater and are first passed through a water seal 4, where the temperature is reduced from that of the top of the superheater to about 200° F., and where part of the tar is deposited, and they are then passed through the cleaning apparatus 6 and 7, and purifying apparatus (not shown) if necessary, before being delivered to the gas holders, the gas mains, and the distributing system. This describes in general the manufacture of "carburetted water gas" as it is now generally made. There are several variations from the process as described above, but in general, for all variations, the stack valve 8 is open to the atmosphere during the air "blow", and closed to the atmosphere during the steam "run", so that the gas made in this part of the cycle passes to the distributing system.

When operating a water gas set with my invention the cycle varies from that described above in that the stack valve 8 is closed through all or part of the air "blow" period of the cycle, allowing all or part of the "blow gas" to pass into the distributing system. In a carburetted water gas set part of the "blow gas" is burned with secondary air to heat the carburetor and the superheater with resulting conversion of the blow gas into a gas of little or no calorific value due to more or less complete combustion of its combustible constituents. All of the blow gas is not ordinarily required for such heating purposes. The blow gas which is not so required may be passed through the carburetor and superheater and then into the distributing system. The blow gas which is so employed may also be passed, after secondary combustion, into the distributing system. Where the maximum gas volume is required to be produced by the water gas set all of the blow gas including that which is employed for secondary combustion as well as that which is not so required may be passed to the distributing system, it being evident that that which has been employed for heating will be passed to the distributing system after such use and while it is made up largely of products of combustion having no calorific value. I provide a mixing chamber 5 to supply liquid hydrocarbons to the gas, preferably, after it leaves the superheater 3, and in the drawing I have shown this mixing chamber located between the water-seal box 4 and the scrubber 6. A pipe 14, connecting the mixing chamber 5 to the storage tank 15, delivers a volatile liquid hydrocarbon, such as propane, $C_3H_8$, or butane, $C_4H_{10}$, or mixtures thereof or other suitable hydrocarbon, from the tank 15 to the mixing chamber 5 under control of a valve 16. The requirements of the liquid are that it shall be volatile under the conditions at which it is admitted to the gas mixture, and that it should remain substantially in the gaseous or vaporous state under all conditions that the gas will encounter during distribution to the point at which it is utilized. Further, the liquid, when vaporized, should have a sufficient heating value, that the addition of proper amounts to the gases coming out of superheater 3, will form a resultant mixture of the required heating value. The valve 16, admitting the volatile liquid to the mixing chamber 5, is opened during any part of the cycle to allow a sufficient amount of the liquid into the mixing chamber that the resultant mixture of all gases and vapors will have the required heating value. In operation, it might be more advantageous to admit the liquid only in that part of the cycle that the air "blow" gases were being admitted to the system when the heat content of the gases coming out of the superheater would be of comparatively small value. However, it is not essential that all of the liquid be added at this part of the cycle, but in some cases it may be better if some of the liquid be added during the steam "run".

As shown in the drawing, the mixing chamber 5 is placed after the water-seal box 4, so that the gases entering the mixing chamber will normally be at a temperature of about 200° F. The addition of the volatile liquid will lower this temperature due to the latent heat required for the evaporation of the liquid. This lowering of the temperature will be of considerable magnitude, but will be desirable to a certain point as the tar made in the water-gas set is more readily extracted when the gas is reduced in temperature, and such reduction in temperature is usually effected by a circulation of water in the gas-cleaning apparatus. When using my invention, the water circulation for the cooling and cleaning apparatus can be greatly reduced on account of the cooling effected by the evaporation of the volatile liquid. When making a gas mixture with a comparatively high resulting B. T. U. value, the cooling due to the evaporation of the volatile liquid may be more than is required for best results, if all of the gas out of the superheater to the distributing system is passed through the water seal in the water-seal box 4, and for this reason I provide a by-pass 17 with a valve 18 so arranged that a portion of the gases out of the superheater to the distributing system can be passed into the mixing chamber 5 without having passed through the water of the water seal 4 with a consequent reduction in their temperature. In this way the temperature of the gases entering the mixing chamber 5 through pipe 19 can be controlled so that the gases leaving the mixing chamber by pipe 20 will not be of too low a temperature for proper operation of the gas plant. As an alternate method some or all of the volatile liquid may be fed into the gas through pipe 22 before the gas passes through the water-seal box 4 by the opening of valve 21.

The following is an example of the conditions which may obtain when operating my invention. Assume that it is desired to make a final gas having 550 B. T. U. per cubic foot and that it is also desired that the portion made during the steam "run" will be approximately 550 B. T. U. per cu. ft., and the portion made during the air "blow" will have about the same heating value. Further assume a set that will make approximately 15,000 cu. ft. of "blue water gas" of 300 B. T. U. per cu, ft. per cycle; that 75,000 cu. ft. of gas of about 20 B T. U. per cu. ft. will be made during the "blow" of each cycle; and that it is desired to use 25,000 cu. ft. of this "blow gas"; that the oil gas made will have a heating value of approximately 1700 B. T. U. per cubic foot; and that the volatile liquid used contains approximately 3,000 B. T. U. per cubic foot in the gaseous or vapor phase, and approximately 100,000 B. T. U. per gallon in the liquid phase. Under the above conditions approximately 3300 cu. ft. of "oil gas" will be required, and approximately 160 gallons of volatile liquid will be needed. This 160 gallons of volatile liquid will occupy approximately 5400 cu. ft. in the gaseous or vapor phase.

Thus, during the cycle will be produced approximately 15,000 cu. ft. of "blue water gas" and 3300 cu. ft. of "oil gas", or approximately 18,300 cu. ft. of gas during that part of the cycle that gas is normally delivered to the distributing system; and 25,000 cu. ft. of "blow gas" and 5400 cu. ft. of vaporized liquid, or approximately 30,400 cu. ft. during that part of the cycle that gas is normally wasted to the atmosphere. So that by the application of my invention, the "water gas" set will produce approximately 266% as much gas as would be the case without the application of my invention in the case illustrated.

Assuming a latent heat of evaporation of 135 B. T. U. per lb. for the volatile liquid, also assuming that the weight of the volatile liquid is 5 lbs. per gallon, and using a mean specific heat of 7 B. T. U. for all of the gases, per pound mol. of gas (approximately 360 cu. ft. of gas), the addition of 160 gallons of volatile liquid would lower the temperature of the 43,300 cu. ft. of gases entering the mixing chamber from the water gas set, by approximately 130° F. Thus, if they entered the mixing chamber at 200° F., they would leave the mixing chamber at approximately 70° F. If it were required to maintain a higher B. T. U. value than 550 in the mixed gas, a relatively greater portion of the volatile liquid would be required, with a greater lowering of the temperature; also if all of the liquid were introduced during the "blow" and none during the run, in the example cited, the lowering of the temperature would greatly exceed 130° F. In fact, in the latter case, the temperature might be lowered to such an extent as to interfere with the operation of the apparatus, if the "blow gas" were delivered to the mixing chamber at the temperatures generally prevailing in gases which have passed through a water seal (approximately 200° F.). In this event I would open the by-pass around the water seal, as previously described, to such an extent that the gases would leave the mixing chamber at or about the most advantageous temperature.

While I have described my invention in its application to the manufacture of carbureted water gas, I do not wish to limit its use to that purpose, as it may be used with equal facility and has the same advantages when used in connection with apparatus for the manufacture of "blue water gas", and also in other applications. In fact, any hot waste gas can be brought to any commercial heating value by the proper application of my invention.

The present invention is of particular value for taking care of peak load requirements. The ordinary equipment of a gas plant is designed to take care of the ordinary requirements, but in order to take care of peak load requirements a much larger installation is needed than is required for ordinary operations. However, at times during the year, and usually for relatively short periods of time, excessive demands are made upon the gas plant which the plant is not well equipped to meet without having idle gas-making capacity during the greater portion of the year. The present invention enables the liquefied gases which are readily available in tank cars to be employed for supplementing the ordinary gas-making operation in such a way that peak load requirements can be readily met without any additional gas-making equipment, and with only a minimum of change in present equipment to provide for the introduction of the liquefied gas into the gas main, together with sufficient diluting gas, so that the liquefied gas will be vaporized and blended in regulated amounts with the other gas to give an increased gas production to take care of the temporary peak load requirements. In the ordinary carburetion of water gas by cracking gas oil the amount of oil that can be sufficiently well cracked depends upon the amount of heat stored in the checker chambers. Furthermore, there is a limit to the rate at which gas oil can be introduced into the carburetor in obtaining efficient carburetion. This means that only a definite maximum amount of gas oil can be effectively used in carbureting water gas; this amount is not appreciably in excess of that required for enriching the water gas to average city standards. Hydrocarbons are not gasified (by cracking) as efficiently in an atmosphere of air blast gas as in water gas. To obtain maximum capacity and high thermal efficiency I prefer to enrich the blue gas (water gas) by cracking hydrocarbons therein, and to enrich substantially all of the blast gas by the introduction of volatile hydrocarbons. It is not practicable to enrich all of the blast gas by cracking hydrocarbons in the checker chambers. If this were attempted it would require continuous introduction of oil into these chambers. This is not feasible because time is required to heat the checkerwork by the combustion of gases therein. In my process I am not thus limited and I find it possible to enrich substantially all of the blast gases and at a high thermal efficiency, by the use of volatile hydrocarbons.

Because valve 8 is closed substantially throughout both the run and the blow periods in my process the blow gases which include the combustion gas from the checker chambers have a lower calorific value than the gas commonly known as blow-run gas; namely, they may have a heating value as low as 20 B. T. U. per cubic foot. But such gas can readily be increased in calorific value to e. g. 550 B. T. U. by the use of volatile hydrocarbons in accordance with the present invention.

Where the hydrocarbons, propane and butane are referred to in the appended claims, it is to be understood that the use of such hydrocarbons in the chemically pure form is not intended, and that commercial grades of these hydrocarbons which frequently contain minor amounts of other hydrocarbons may be used.

I claim:—

1. A method of producing mixed gases in a water gas generating set having a solid fuel bed, heat exchange chambers, a wash box, and an enriching chamber; which comprises air blasting the fuel bed in the gas generating set, burning a portion of the generated air blast gases in the heat exchange chambers, and withdrawing the products of combustion from the set, passing the remaining portion of the air blast gases through the heat exchange chambers and washing the gases by passing through a body of liquid in the wash box, then enriching and cooling the gas by adding butane thereto in the enriching chamber, then discontinuing the air blasting, admitting steam to the heated fuel bed, and generating water gas, passing the water gas through the heat exchange chambers, washing the water gas in the wash box, and enriching and cooling the water gas by adding butane thereto in the enriching chamber.

2. A method of producing mixed gases in a water gas generating set having a solid fuel bed, heat exchange chambers, a wash box, and an enriching chamber; which comprises air blasting the fuel bed in the gas generating set, burning a portion of the generated air blast gases in the heat exchange chambers, and withdrawing the products of combustion from the set, passing the remaining portion of the air blast gases through the heat exchange chambers and washing the gases by passing through a body of liquid in the wash box, then enriching and cooling the gas by adding propane thereto in the enriching chamber, then discontinuing the air blasting, admitting steam to the heated fuel bed, and generating water gas, passing the water gas through the heat exchange chambers, washing the water gas in the wash box, and enriching and cooling the water gas by adding propane thereto in the enriching chamber.

3. A method of producing mixed gases in a water gas generating set having a solid fuel bed, heat exchange chambers, a wash box, and an enriching chamber; which comprises air blasting the fuel bed in the gas generating set, burning a portion of the generated air blast gases in the heat exchange chambers, and withdrawing the products of combustion from the set, passing the remaining portion of the air blast gases through the heat exchange chambers and washing the gases by passing through a body of liquid in the wash box, then enriching and cooling the gas by adding a volatile liquid hydrocarbon containing propane, butane or mixtures thereof thereto in the enriching chamber, then discontinuing the air blasting, admitting steam to the heated fuel bed, and generating water gas, passing the water gas through the heat exchange chambers, washing the water gas in the wash box, and enriching and cooling the water gas by adding a volatile liquid hydrocarbon containing propane, butane or mixtures thereof thereto in the enriching chamber.

In testimony whereof I affix my signature.

HENRY ROSENTHAL.